United States Patent
Marcellin et al.

(10) Patent No.: US 8,064,708 B2
(45) Date of Patent: Nov. 22, 2011

(54) METHODS AND SYSTEMS FOR REMOTELY VISUALIZING IMAGES

(75) Inventors: Michael W. Marcellin, Tuscon, AZ (US); Ali Bilgin, Tucson, AZ (US); Hariharan G. Lalgudi, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 938 days.

(21) Appl. No.: 12/039,008

(22) Filed: Feb. 28, 2008

(65) Prior Publication Data
US 2008/0219570 A1 Sep. 11, 2008

Related U.S. Application Data

(60) Provisional application No. 60/904,104, filed on Feb. 28, 2007.

(51) Int. Cl.
*G06K 9/36* (2006.01)
(52) U.S. Cl. .................................................... 382/232
(58) Field of Classification Search .......... 382/128, 382/131–132, 232–233, 240, 248, 305; 375/240.01, 375/240.18–240.19; 707/999.102; 709/231, 709/247, 249; 715/738
See application file for complete search history.

(56) References Cited

U.S. PATENT DOCUMENTS

| | | | |
|---|---|---|---|
| 7,031,506 B2 * | 4/2006 | Tsujii et al. | 382/132 |
| 7,324,695 B2 * | 1/2008 | Krishnan et al. | 382/232 |
| 7,433,523 B2 * | 10/2008 | Sakuyama et al. | 382/233 |
| 7,492,951 B2 * | 2/2009 | Yagishita et al. | 382/232 |
| 7,526,133 B2 * | 4/2009 | Nomizu et al. | 382/232 |
| 7,526,134 B2 * | 4/2009 | Matsubara | 382/232 |
| 7,627,185 B2 * | 12/2009 | Miyazawa et al. | 382/240 |
| 7,889,791 B2 * | 2/2011 | Taubman | 375/240.11 |
| 2004/0165789 A1 | 8/2004 | Li | |

OTHER PUBLICATIONS

Simon Stegmaier, Joachim Diepstraten, Manfred Weiler, Thomas Ertl, "Widening the Remote Visualization Bottleneck", Proceedings of the 3rd International Symposium on Image and Signal Processing and Analysis (2003), pp. 174-179.

Simon Stegmaier, Marcelo Magallon and Thomas Ertl, "A Generic Solution for Hardware-Accelerated Remote Visualization", Joint Eurographics—IEEE TCVG Symposium on Visualization (2002), pp. 87-94.

* cited by examiner

*Primary Examiner* — Jose Couso
(74) *Attorney, Agent, or Firm* — Donald B. Paschburg; F. Chau & Associates, LLC

(57) ABSTRACT

A method for remotely visualizing an image on a client includes the steps of rendering a 2D image from image data on a server, applying a 2D wavelet transform to the 2D image on the server to generate a plurality of sub-bands, identifying code blocks of the sub-bands that correspond to a region of interest in the 2D image on the server, compressing a number of bit planes of each code block using one of a plurality of coding techniques on the server based on the number of bit planes to generate compressed codes, sending the compressed codes from the server to the client, and visualizing a new 2D image on the client using the received compressed codes.

20 Claims, 7 Drawing Sheets

FIG. 5A

| 0 | 1 | 0 | 3 |
|---|---|---|---|
| 3 | 0 | 7 | 0 |
| 0 | 2 | 0 | 2 |
| 6 | 0 | 5 | 0 |

FIG. 5B

Bit plane 1 (LSB)

| 0 | 1 | 0 | 1 |
|---|---|---|---|
| 1 | 0 | 1 | 0 |
| 0 | 0 | 0 | 0 |
| 0 | 0 | 1 | 0 |

Bit plane 2

| 0 | 0 | 0 | 1 |
|---|---|---|---|
| 1 | 0 | 1 | 0 |
| 0 | 1 | 0 | 1 |
| 1 | 0 | 0 | 0 |

Bit plane 3 (MSB)

| 0 | 0 | 0 | 0 |
|---|---|---|---|
| 0 | 0 | 1 | 0 |
| 0 | 0 | 0 | 0 |
| 1 | 0 | 1 | 0 |

METHODS AND SYSTEMS FOR REMOTELY VISUALIZING IMAGES

CROSS-REFERENCE TO RELATED APPLICATIONS

This application claims priority to U.S. Provisional Application No. 60/904,104, filed on Feb. 28, 2007, the disclosure of which is incorporated by reference herein.

BACKGROUND OF THE INVENTION

1. Technical Field

The present disclosure relates generally to the field of image visualization, and more specifically to methods and systems of performing remote visualization of images.

2. Discussion of Related Art

With advances in medical imaging modalities, efficient representation and storage of digital imagery is necessary. Accordingly, schemes for smart data access are of interest. It is desirable to be able to access various resolutions, qualities, and spatial regions of an image locally. Further, remote visualization of images can be useful in the practice of telemedicine.

In one method of remote visualization, volumetric data is sent from a server to a client for local rendering and display by the client. However, volume rendering is a computationally intensive process and often requires dedicated hardware for real time visualization. Although a client can use software to emulate the functions performed by the needed hardware, the quality and frame rate of the rendered image is often inadequate. In another method of remote visualization, the rendering is performed by a server with dedicated hardware. The server receives viewpoint requests from a client and transmits corresponding 2D rendered images back to the client. However, the size of the rendered images and the limited bandwidth between the client and server can make it difficult to properly visualize the image on the client in a timely manner.

Thus, there is a need for more efficient methods and systems for providing remote visualization of images.

SUMMARY OF THE INVENTION

An exemplary embodiment of the present invention includes a method for remotely visualizing an image on a client. The method includes the steps of rendering a 2D image from image data on a server, applying a 2D wavelet transform to the 2D image on the server to generate a plurality of sub-bands, identifying code blocks of the sub-bands that corresponds to a region of interest in the 2D image on the server, compressing a number of bit planes of each code block using one of a plurality of coding techniques on the server based on the number of bit planes to generate compressed codes, sending the compressed codes from the server to the client, and visualizing a new 2D image on the client using the received compressed codes. The server may render the 2D image from 3D volumetric data and the rendering may be further based on viewpoint information received from the client.

When the number of bit planes is 1, the chosen coding technique may include identifying positions of significant bits in the bit plane of the code block and coding the identified positions. When the number of bit planes is 2, the chosen coding technique may include performing a Run-value coding on the two bit planes. When the number of bit planes is 3, the chosen coding technique may include performing a Quad-comma coding on the three bit planes. When the number of bit planes is greater than 3, the chosen coding technique may include performing a Quad-comma coding on the upper three bit planes and coding raw bits of the remaining bit planes.

The visualizing may include decoding the compressed codes to generate decoded codes, performing an inverse 2D wavelet transform on the decoded codes to generate the new 2D image, and displaying the new 2D image. The decoding may include analyzing the compressed codes to determine which of the coding techniques was used and decoding the compressed codes based on the determined coding technique.

The compressing of the number of bit planes for each code block may include determining a number M of most significant bit (MSB) planes and a number L of least significant bit (LSB) planes of the code block based on an importance of the sub-band of the code block, and compressing the M MSB bit planes as first codes using the chosen coding technique and coding raw bits of the L MSB bit planes as second codes. The variables M and L are positive integers that sum to a total bit plane count of the code block.

The sending of the compressed codes may include sending the first codes to the client during a user interaction between the client and the server. The visualizing may include visualizing a less detailed version of the new 2D image from the first codes during the user interaction. The method may further include sending the second codes to the client and visualizing a more detailed version of the new 2D image from the first and second codes after the user interaction has ended.

An exemplary embodiment of the present invention includes a system for performing remote visualization of an image. The system includes a server workstation, a client workstation, a client display, and a network. The server workstation renders a 2D image from image data. The image data may include 3D volumetric data. The server workstation performs a 2D wavelet transform on the rendered image to generate sub-bands having code blocks, compresses a number of most significant bit (MSB) planes of each code block based on a sub-band importance of the code block's sub-band to generate codes, and sends the codes across the network. The client workstation receives the codes from the network, decodes the codes, performs an inverse 2D wavelet transform on the decoded codes to generate a new 2D image, and displays the new 2D image on the client display.

The server workstation may include a hardware accelerated rendering engine to render the 2D image. The client workstation may further include a graphical processing unit to perform the inverse wavelet transform.

The client workstation may further include a client input device. The client input device may be used to select a desired viewpoint. The client workstation can send data including the selected viewpoint across the network to the server workstation. The server workstation may then render the 2D image based on the received viewpoint information.

An exemplary embodiment of the present invention includes a method for visualizing an image. The method includes the steps of applying a 2D wavelet transform to a 2D image to generate a plurality of sub-bands, identifying code blocks of the sub-bands that correspond to a region of interest in the 2D image, generating first codes from a number M of most significant bit (MSB) planes of each code block and second codes from a number L of least significant bit (LSB) planes of each code block based on an importance of the sub-band of the code block, visualizing a less detailed 2D image from the first codes during a user interaction between a client and server, and visualizing a more detailed 2D image from the first and second codes after the user interaction has ended. The variables of M and L are positive integers.

When M is 1, the generating of first codes may include identifying positions of significant bits in the bit plane and coding the identified positions. When M is 2, the generating of first codes may include performing a Run-value coding on the two bit planes. When M is 3, the generating of first codes may include performing a Quad-comma coding on the three bit planes. When M is greater than 3, the generating of first codes may include performing a Quad-coding on the upper three bit planes and coding raw bits of the remaining bit planes.

BRIEF DESCRIPTION OF THE DRAWINGS

Exemplary embodiments of the invention can be understood in more detail from the following descriptions taken in conjunction with the accompanying drawings in which:

FIG. 5A illustrates an example of wavelet coefficients of a code block;

FIG. 5B illustrates bit planes derived from the code block of FIG. 5A;

DETAILED DESCRIPTION OF EXEMPLARY EMBODIMENTS

In general, exemplary methods and systems for providing remote visualization of images will now be discussed in further detail with reference to FIGS. 1-7.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
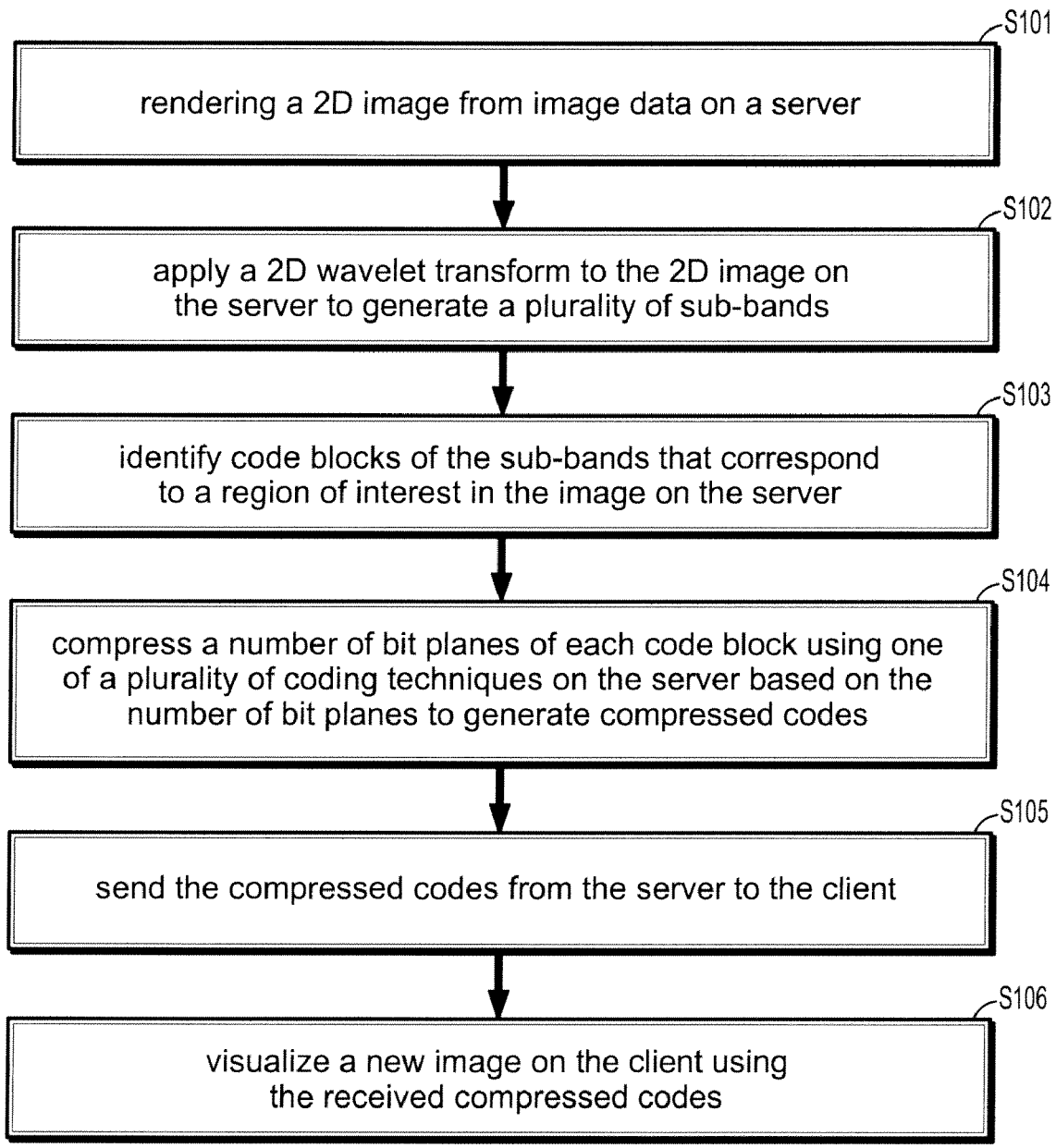
FIG. 1 illustrates a method for remotely visualizing an image on a client according to an exemplary embodiment of the present invention.
Figure 2:
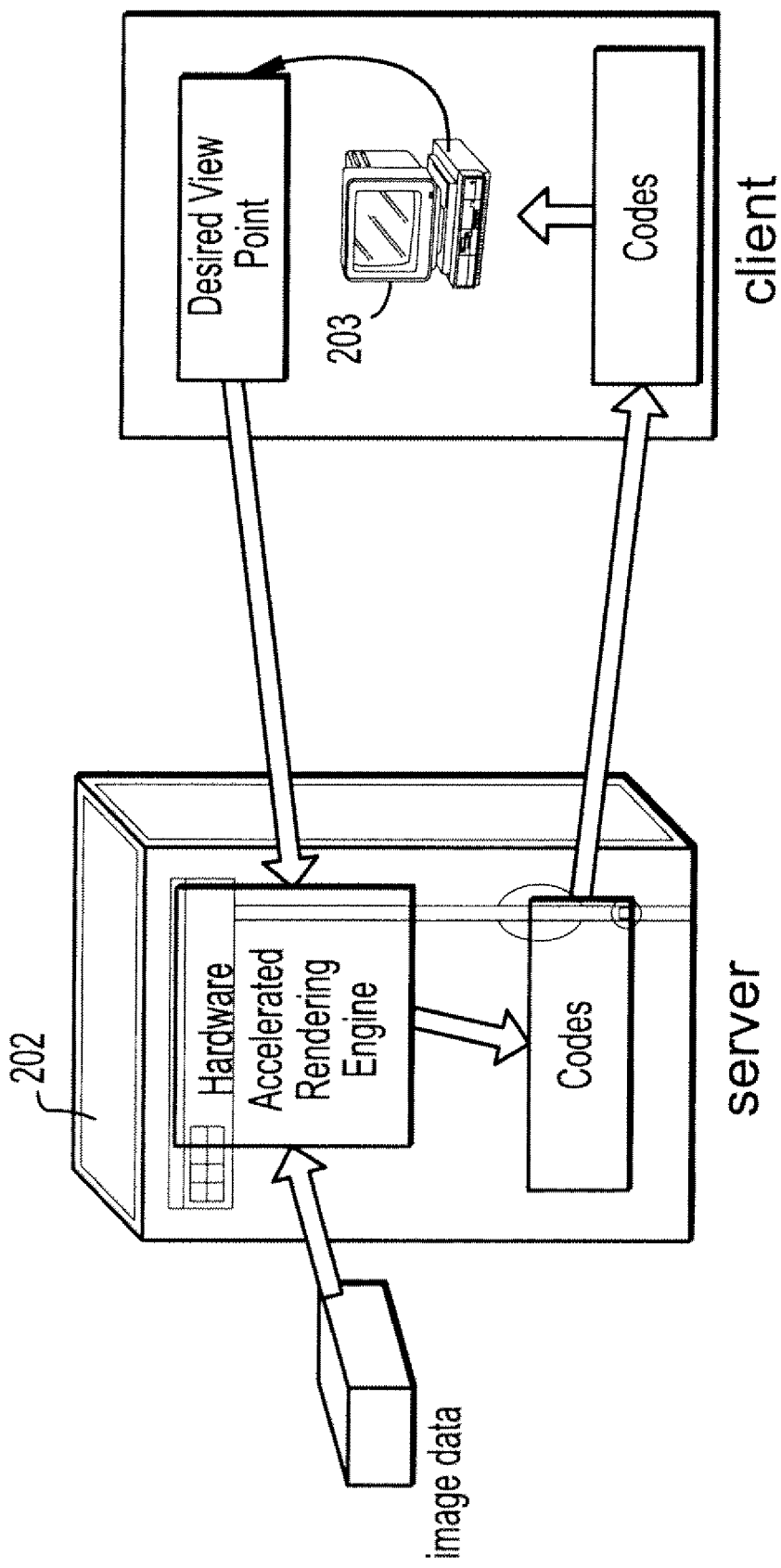
FIG. 2 illustrates a system according to an exemplary embodiment of the present invention that may be used to implement the method of FIG. 1.

FIG. 1 illustrates a method for remotely visualizing an image on a client according to an exemplary embodiment of the present invention. FIG. 2 illustrates a system according to an exemplary embodiment of the present invention that may be used to implement the method of FIG. 1.

Referring to FIGS. 1 and 2, the method includes the steps of rendering a 2D image from image data on a server (S101), applying a 2D wavelet transform to the 2D image on the server to generate a plurality of sub-bands (S102), identifying code blocks of the sub-bands that correspond to a region of interest in the 2D image on the server (S103), compressing a number of bit planes of each code block using one of a plurality of coding techniques on the server based on the number of bit planes to generate compressed codes (S104), sending the compressed codes from the server to the client (S105), and visualizing a new 2D image on the client using the received compressed codes (S106).

As shown in FIG. 2, the server is housed in a server workstation 202 and the client is housed in a client workstation 203. The client and server may communicate across a network or via a direct connection. Although not shown in FIG. 2, the client and server may also be housed within the same workstation.

The server may be a Picture Archiving and Communication System (PACS) server. The server workstation 202 may include a hardware accelerated rendering engine to perform the rendering of the 2D image from the image data. The image data may be provided, for example, by a Computed Tomography (CT) scan, Positron Emission Tomography (PET) scan, a magnetic resonance image (MRI) scan, etc. The image data may include 3D volumetric data or multi-volume 3D data such as 3D+time (e.g., "4D") or volumetric fusion data. For example 4D data may include images such as a beating heart in a high-end CT scan and volumetric fusion data includes data from combined scans (e.g., PET+CT).

The server can arbitrarily choose a particular viewpoint and render the 2D image from the image data based on that viewpoint. For example, assume the image data represents the heart of a patient and the server chooses a viewing angle that represents the back of the heart. The server can also receive a desired viewpoint as a client request from the client. For example, the client workstation 203 may include an input device which enables a user to select a viewpoint that would represent the front of the heart. The server would then render a 2D image of the front of the heart.

Figure 3:
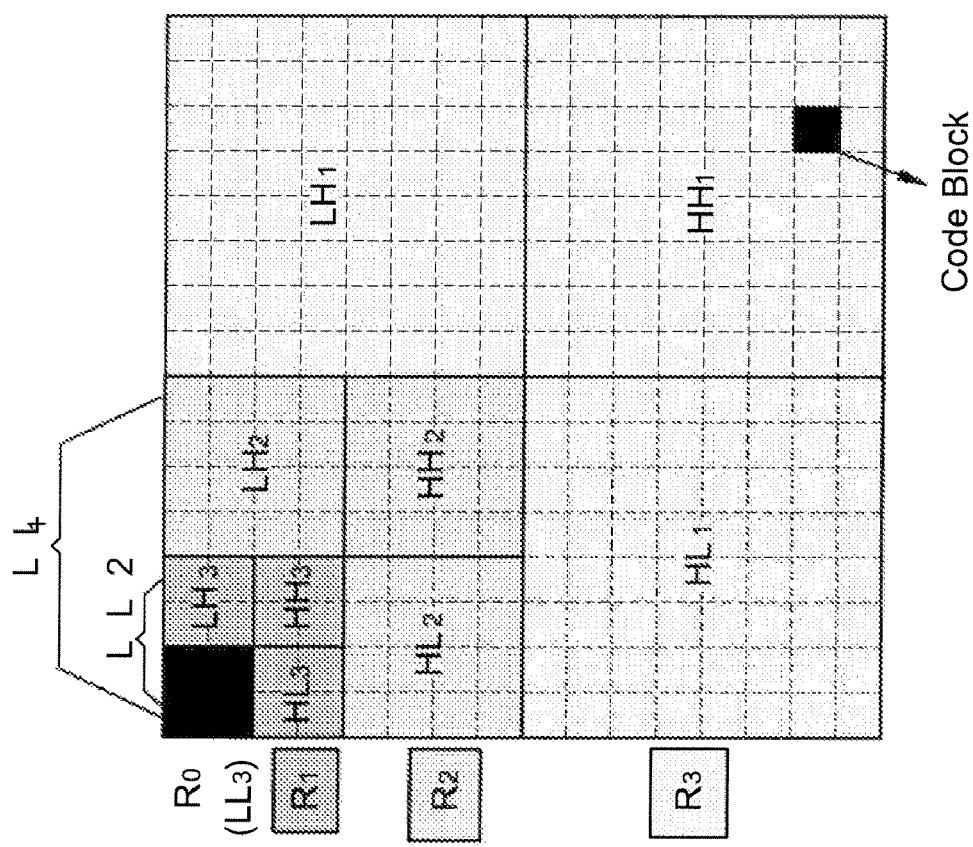
FIG. 3 illustrates a sample image subjected to three levels of wavelet transform.

As discussed above, once the 2D image has been rendered, the server can then apply a 2D wavelet transform to the rendered 2D image. With a 2D wavelet transform, the image is decomposed into four sub-bands: LL, HL, LH, and HH. The LL sub-band gives a low resolution representation of the original image. The wavelet transform can be repeated on the LL band to generate more resolution levels. For example, FIG. 3 illustrates the result of subjecting a 2D image to three levels of wavelet transform. The first level of wavelet transform is performed on the original image and yields sub-bands $LL_1$, $LH_1$, $HL_1$, and $HH_1$. The second level of wavelet transform is performed on sub-band $LL_1$ and yields sub-bands $LL_2$, $LH_2$, $HL_2$, and $HH_2$. The third level of wavelet transform is performed on sub-band $LL_2$ and yields sub-bands $LL_3$, $LH_3$, $HL_3$, and $HH_3$. The subscript in the sub-band notation denotes the number of levels of wavelet transform.

Wavelet coefficients from the $LL_3$ sub-band yield a low resolution version ($R_0$) of the original image. Contributions of subsequent sub-bands can be used to yield increasingly higher resolution versions of the original image. For example, adding contributions of the $LH_3$, $HL_3$, and $HH_3$ sub-bands yields a higher resolution version ($R_1$) of the image. In this way, the amount of wavelet coefficients considered for transmission to the client can be tailored based on a display resolution of a client display.

Figure 4A:
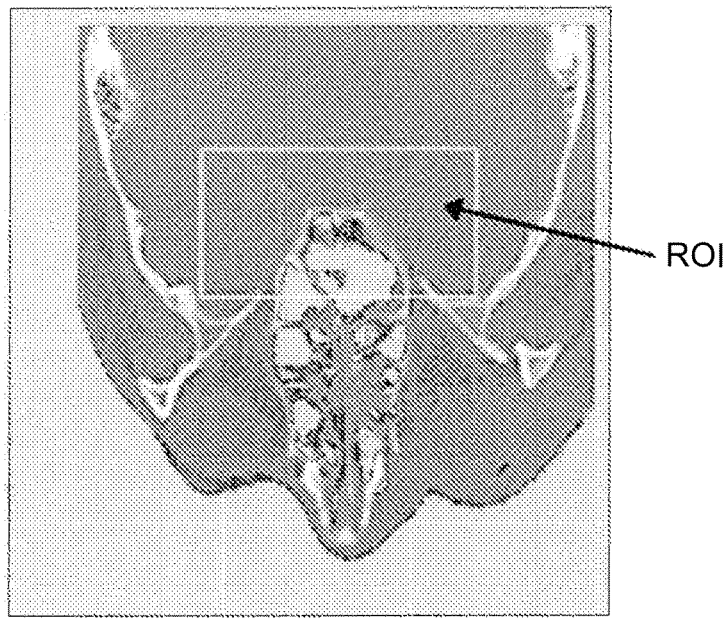
FIG. 4A illustrates a region of interest in a rendered 2D image.
Figure 4B:
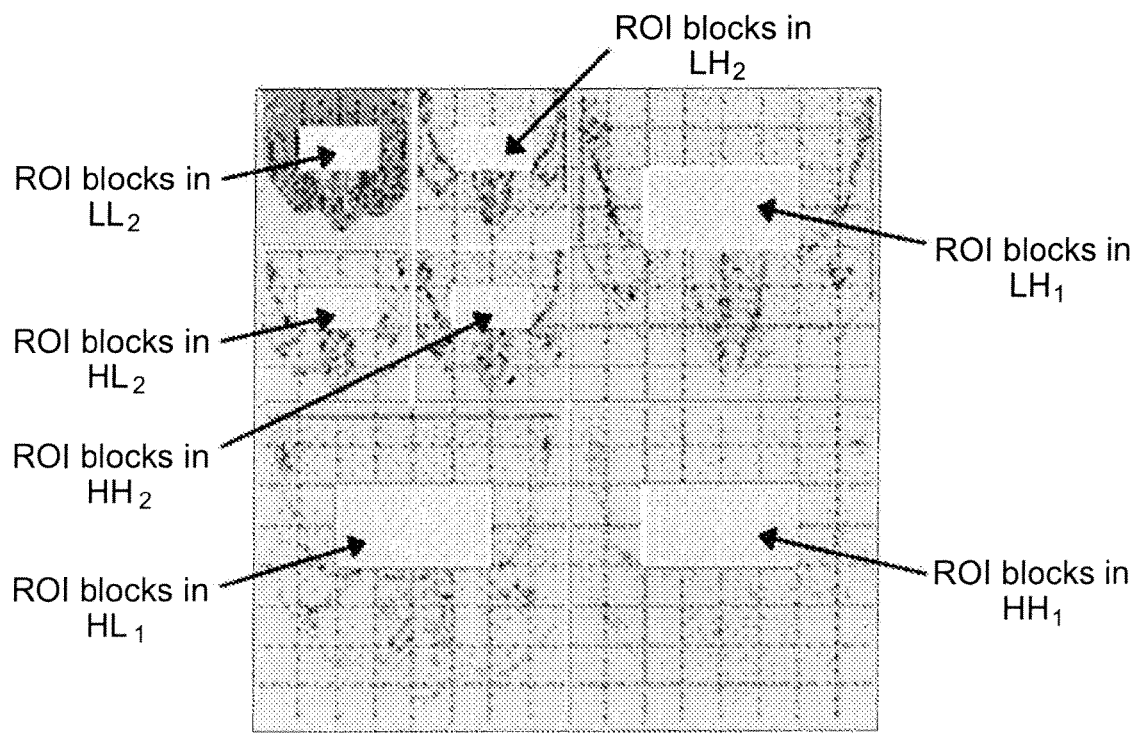
FIG. 4B illustrates code blocks in sub-bands that correspond to the region of interest after the image of FIG. 4A is subjected to two levels of wavelet transform.

FIG. 4A illustrates a region of interest (ROI) in an original rendered 2D image and FIG. 4B illustrates ROI code blocks in sub-bands generated from performing wavelet transforms on the image of FIG. 4A. Each code block has an I×J array of wavelet coefficients, where I and J are positive integers. FIG.

5A illustrates coefficients of an exemplary code block which contains a 4×4 array of wavelet coefficients. Note that the array illustrated in FIG. 5A is sized merely for ease of discussion, and may be smaller or greater based on the application. The code block can be displayed as several bit planes. Since the array of FIG. 5A includes coefficients sized no higher than 7, the coefficients of the code block can be represented by three bit planes. The three bit planes are illustrated in FIG. 5B. For example, the coefficient of 6 in FIG. 5A is represented in binary as "110", as respectively shown by the values of 1, 1, and 0 in the upper left corners of bit planes 3, 2, and 1 in FIG. 5B. Note that the coefficients illustrated in FIG. 5A are sized merely for ease of discussion, and may be smaller or greater based on the results of wavelet transforms on the original image, thereby yielding a fewer or greater number of bit planes. A limited amount of quality scalability may be introduced by stacking bit planes into two parts starting from the Most Significant Bit (MSB) plane. For example bit plane 3 and 2 could be stacked and sent as a first quality layer and bit plane 1 could be sent as a second quality layer.

Figure 6:
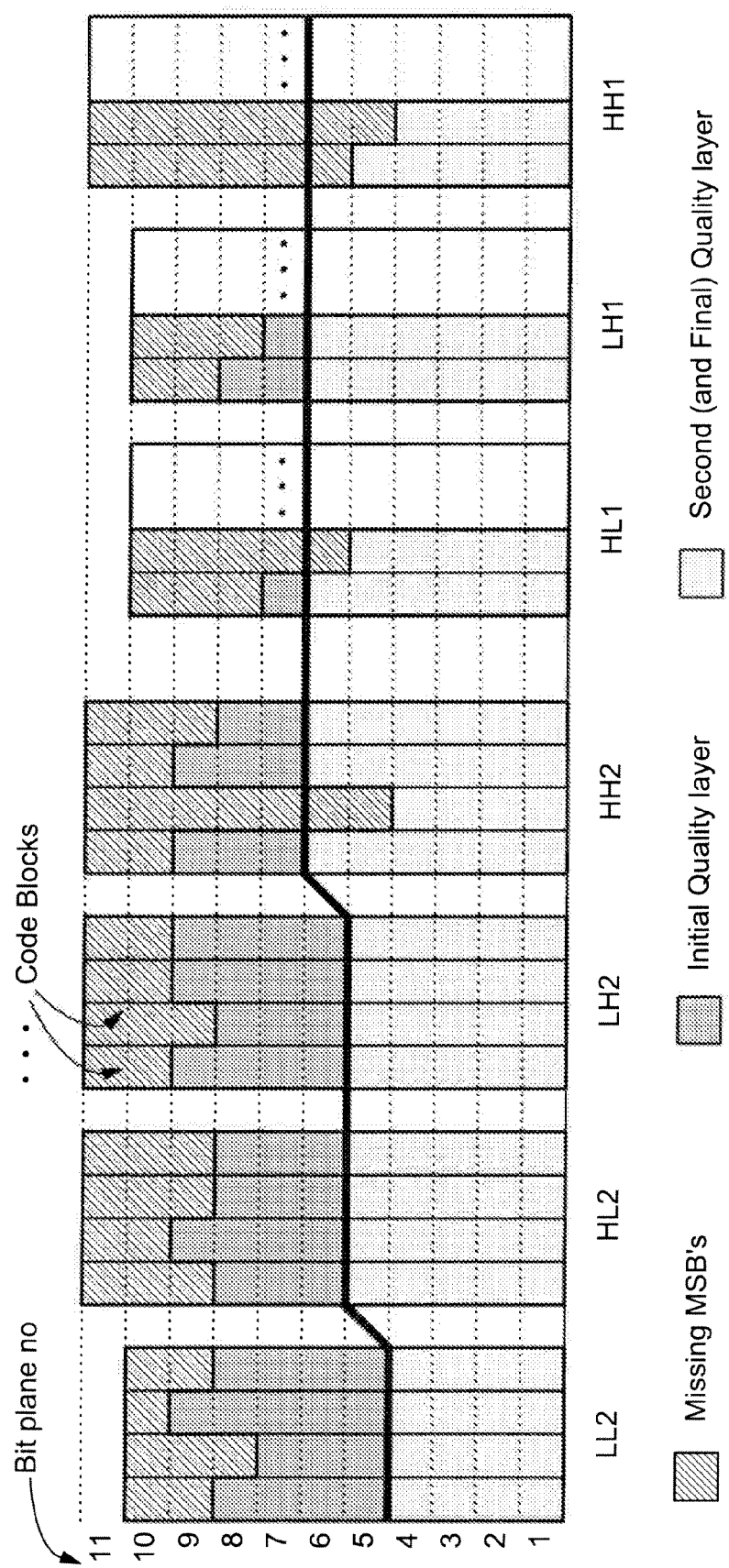
FIG. 6 illustrates dividing of code blocks into two layers of bit planes according to an exemplary embodiment of the present invention.
Figure 7:
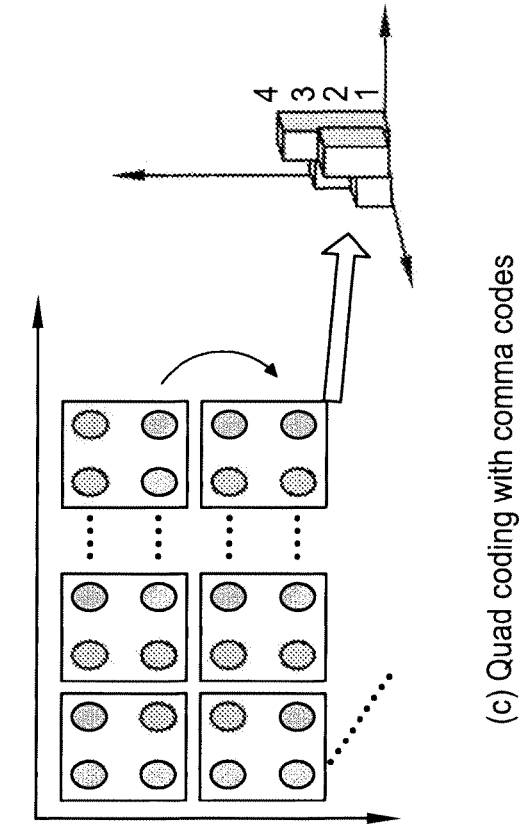
FIG. 7A, FIG. 7B, and FIG. 7C illustrate coding techniques that may be applied to coding blocks according to exemplary embodiments of the present invention.
Figure 7:
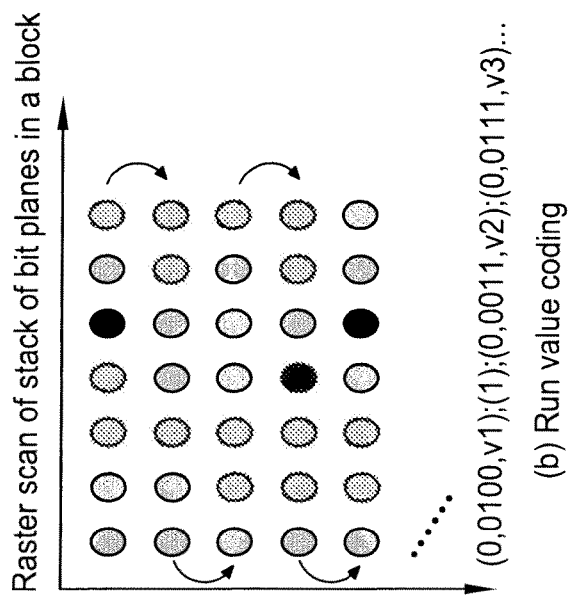

FIG. 6 illustrates dividing of code blocks into two layers of bit planes according to an exemplary embodiment of the present invention. The code blocks for the sub-bands in FIG. 4B are represented by 11 bit planes in FIG. 6. However, the present invention is not limited to 11 bit planes as the code blocks can be represented by a fewer or a greater number of bit planes based according to the size of the coefficient values of the code blocks. For the $LL_2$ sub-band shown in FIG. 6, all bit planes above the $4^{th}$ bit plane are stacked and sent in the first quality layer. The other sub-bands have fewer bit planes included in the first layer due to their lesser importance. The importance of each sub-band may be measured from a mean square error (MSE) point of view by synthesis filter energy weights associated with the inverse wavelet transform. These energy weights may be rounded to the nearest power of two and used to adjust the stack lengths. In the example of FIG. 6, code blocks belonging to the $HL_2$ and $LH_2$ sub-bands will have one less bit plane in the first layer while the $HH_2$ and level-1 sub-bands have two less. All-zero bit planes in a code block are termed as missing MSBs in FIG. 6.

With unconstrained bandwidth, all the raw wavelet coefficients (for a particular resolution and spatial region of interest) can be sent to get a lossless real time viewing experience. However, when bandwidth is limited, the server may transmit only the first layer during an interactive session with the client. Once the interaction stops, the second layer can be sent to give a lossless representation of the image at that particular viewpoint.

Quality of the image reconstructed from the first layer will increase as the number of bit planes (e.g., a "thickness") increases. The thickness of the first layer can be adjusted based on a desired bit rate, which may be computed from available bandwidth and a desired frame rate. For a given "thickness", the required transmission bandwidth can be reduced by entropy coding of the wavelet coefficients. The coded wavelet coefficients can then be transmitted to the client. However, care must be taken not to increase computational complexity to the point that the client cannot decode the coded wavelet coefficients in real time.

The coding of the wavelet coefficients for transmission to the client can be based on the number of bit planes in each of the first and second layers. FIG. 7a shows the coding schemes employed for the wavelet coefficients of a code block, based on the number of bit planes. Entropy coding is restricted to the first three (or less) bit planes in the first layer. When there is one bit plane, the position indices of significant bits, such as 'ones' in that bit plane are coded. For example, if only bit plane 3 of FIG. 5B is to be sent, then position indices of 1, 9, and 11 would be coded.

Run-value coding may be used when two bit planes are present in the first layer. Run-value coding assumes a sparse distribution of non-zero values. The run length of zeros and values of the non-zero coefficient terminating the run are coded. When the run length reaches a predetermined maximum, a '1' is coded and zero-run is restarted. The maximum may be determined based on statistical simulations. For example, in one embodiment of the present invention, the maximum may be set to 16. With run-length termination, '0' followed by four bits identifying the run length is coded. This is followed by a value of the coefficient that terminated the run. FIG. 7b illustrates an example of Run-value coding. Referring to FIG. 7B, each light circle represents two bits that are both zero and each dark circle represents two bits where at least one is not zero. A first one of the bits corresponds to a first bit plane of a coefficient in a code block and the other bit corresponds to a second bit plane of the coefficient. For example, the stack of bit planes shown in FIG. 7B may be coded as follows: (0,0100,v1);(1);(0,0011),v2);(0,0111,v3), where "(0," represents the start of a zero run, the binary value following "(0," represents the number of zeros in zero run, "v1-v3" represents the non-zero value that terminated the zero run, and "(1)" represents the predetermined maximum number (e.g., 16) of consecutive 0s. Alternately, a '1' may be used to represent the start of a zero run and '0' may be used to represent the pre-determined maximum number.

Quad-Comma coding may be used when three bit planes are present in the first layer. FIG. 7C illustrates an example of Quad-Comma coding. Referring to FIG. 7C, each light circle represents three bits of a coefficient. Each square represents a 'quad' of four coefficients. With Quad-Comma coding, one bit is first spent to indicate the significance of a quad. If a quad is significant, the quad is further coded by the values of the coefficients. A quad is considered significant if one or more of its four coefficients are non-zero. A quad is considered non-significant when all four of the coefficients are zero. For example, a significant quad followed by an non-significant quad may be coded as follows: "1,v1,v2,v3,v4,0", where the '1' indicates that the quad is significant, v1-v4 indicate the four coefficients of the significant coefficients, and the '0' indicates that the next quad is not significant (e.g., the next four coefficients are all 0). Alternately a '0' can be used to indicate that a quad is significant and a '1' to indicate that a quad is not-significant. When the number of bit planes exceeds 3, Quad-comma coding may be used for 3 MSB planes and the raw bits for the remaining bit planes can be coded directly.

It should be noted that coefficients of a code block generated by a wavelet transform may be positive or negative. When a coefficient is non-zero, a sign bit may be appended to the value of the coefficient.

Once the bit planes have been coded/compressed as codes, the server sends them to the client. For example, the server may send the codes across a network or a direct connection to the client. The client receives the codes, decompresses/decodes them, and performs an inverse wavelet transform on the decompressed/decoded codes to generate a new 2D image. The client can then visualize the new 2D image on a client display. The client may include a graphical processing unit (GPU) to perform the inverse wavelet transform, thereby enabling the client to primarily focus on entropy de-coding and visualization.

It is to be understood that the particular exemplary embodiments disclosed above are illustrative only, as the invention may be modified and practiced in different but equivalent manners apparent to those skilled in the art having the benefit of the teachings herein. Furthermore, no limitations are intended to the herein described exemplary embodiments, other than as described in the claims below. It is therefore evident that the particular exemplary embodiments disclosed herein may be altered or modified and all such variations are considered within the scope and spirit of the invention. Accordingly, the protection sought herein is as set forth in the claims below.

What is claimed is:

1. A method for remotely visualizing an image on a client, the method comprising steps of:
rendering a 2D image from image data on a server;
applying a 2D wavelet transform to the 2D image on the server to generate a plurality of sub-bands;
identifying code blocks of the sub-bands that correspond to a region of interest in the 2D image on the server;
compressing a number of bit planes of each code block using one of a plurality of coding techniques on the server based on the number of bit planes to generate compressed codes;
sending the compressed codes from the server to the client; and
visualizing a new 2D image on the client using the received compressed codes,
wherein a processor performs the steps.

2. The method of claim 1, wherein when the number of bit planes is 1, the chosen coding technique includes identifying positions of significant bits in the bit plane of the code block and coding the identified positions.

3. The method of claim 1, wherein when the number of bit planes is 2, the chosen coding technique includes performing a Run-value coding on the two bit planes.

4. The method of claim 1, wherein when the number of bit planes is 3, the chosen coding technique includes performing a Quad-comma coding on the three bit planes.

5. The method of claim 1, wherein when the number of bit planes is greater than 3, the chosen coding technique includes performing a quad-comma coding on only the upper three bit planes and coding raw bits of the remaining bit planes.

6. The method of claim 1, wherein the visualizing comprises:
decoding the compressed codes to generated decoded codes;
performing an inverse 2D wavelet transform on the decoded codes to generate the new 2D image; and
displaying the new 2D image.

7. The method of claim 1, wherein the server renders the 2D image based on viewpoint information received from the client.

8. The method of claim 1, wherein compressing the number of bit planes of each code block comprises:
determining a number M of most significant bit (MSB) planes and a number L of least significant bit (LSB) planes of the code block based on an importance of the sub-band of the code block; and
compressing the M MSB bit planes as first codes using the chosen coding technique and coding raw bits of the L MSB bit planes as second codes,
wherein M and L are positive integers that sum to a total bit plane count of the code block.

9. The method of claim 8, wherein the sending of the compressed codes comprises sending the first codes to the client during a user interaction between the client and the server.

10. The method of claim 9, wherein the visualizing comprises visualizing a less detailed version of the new 2D image from the first codes during the user interaction.

11. The method of claim 10 further comprises sending the second codes to the client and visualizing a more detailed version of the new 2D image from both the first codes and the second codes after the user interaction has ended.

12. A system for performing remote visualization of an image, the system comprising:
a server workstation;
a client workstation;
a client display; and
a network,
wherein the server workstation renders a 2D image from image data, performs a 2D wavelet transform on the rendered image to generate sub-bands having code blocks, compresses a number of most significant bit planes of each code block based on a sub-band importance of the code block's sub-band to generate codes, and sends the codes across the network and, wherein the client workstation receives the codes from the network, decode the codes, performs an inverse wavelet transform on the decoded codes to generate a new 2D image, and displays the new 2D image on the client display.

13. The system of claim 12, wherein the server workstation comprises a hardware accelerated rendering engine to render the 2D image.

14. The system of claim 12, wherein the client workstation further comprises a graphical processing unit (GPU) to perform the inverse wavelet transform.

15. The system of claim 12, further comprising a client input device to select a desired viewpoint, wherein the client workstation sends data including the selected viewpoint across the network to the server workstation and the server workstation renders the 2D image based on the received data.

16. A non-transitory computer readable medium, tangibly embodying a program of instructions executable by a computer to perform method steps for visualizing an image, the method comprising:
applying a 2D wavelet transform to a 2D image to generate a plurality of sub-bands; identifying code blocks of the sub-bands that correspond to a region of interest in the 2D image;
generating first codes from a number M of most significant bit (MSB) planes of each code block and second codes from a number L of least significant bit (LSB) planes of each code block based on an importance of the sub-band of the code block;
visualizing a less detailed 2D image from the first codes during a user interaction between a client and server; and
visualizing a more detailed 2D image from the first and second codes after he user interaction has ended, wherein M and L are positive integers.

17. The computer readable medium of claim 16, wherein when M is 1, the generating of first codes comprises identifying positions of significant bits in the bit plane and coding the identified positions.

18. The computer readable medium of claim 16, wherein when M is 2, the generating of first codes comprises performing a run value coding on the two bit planes.

19. The computer readable medium of claim 16, wherein when M is 3, the generating of first codes comprises performing a quad-comma coding on the three bit planes.

20. The computer readable medium of claim 16, wherein when M is greater than 3, the generating of first codes comprises performing a quad-coding on the upper three bit planes and coding raw bits of the remaining bit planes.

* * * * *